United States Patent
Koshy (10) Patent No.: US 11,336,546 B2
(45) Date of Patent: May 17, 2022

(54) MULTIPLE LINK AGGREGATION AMONG LOCAL AREA NETWORKS

(71) Applicant: Dell Products, LP, Round Rock, TX (US)

(72) Inventor: Kamal J. Koshy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 175 days.

(21) Appl. No.: 15/645,353

(22) Filed: Jul. 10, 2017

(65) Prior Publication Data
US 2019/0014024 A1    Jan. 10, 2019

(51) Int. Cl.
| | | |
|---|---|---|
| *G06F 15/173* | (2006.01) | |
| *H04L 43/08* | (2022.01) | |
| *H04L 12/46* | (2006.01) | |
| *H04L 45/24* | (2022.01) | |
| *H04W 48/18* | (2009.01) | |
| *H04W 40/12* | (2009.01) | |
| *H04L 45/00* | (2022.01) | |

(52) U.S. Cl.
CPC .......... *H04L 43/08* (2013.01); *H04L 12/4641* (2013.01); *H04L 45/245* (2013.01); *H04W 40/12* (2013.01); *H04W 48/18* (2013.01); *H04L 45/70* (2013.01)

(58) Field of Classification Search
CPC ................. H04L 43/08; H04L 45/70
See application file for complete search history.

(56) References Cited

U.S. PATENT DOCUMENTS

| | | | |
|---|---|---|---|
| 7,389,534 B1 * | 6/2008 | He | H04L 63/0272 713/153 |
| 7,539,175 B2 | 5/2009 | White | |
| 7,787,494 B1 * | 8/2010 | Aubin | H04L 12/4675 370/352 |

(Continued)

OTHER PUBLICATIONS

Cisco Systems, Inc., "Client VPN over Wireless LAN with WLC Configuration Example," Oct. 13, 2008, 20 pages, http://www.cisco.com/c/en/us/support/docs/wireless-mobility/wlan-security/81837-vpnclient-wlan-wlc-conf.html.

(Continued)

*Primary Examiner* — Hua Fan
(74) *Attorney, Agent, or Firm* — Prol Intellectual Property Law, PLLC; H. Kenneth Prol (57) ABSTRACT

An information handling system and method includes a plurality of local area networks, an access point, and a client device. The access point includes a server processor in communication with access point network interface circuitry. The server processor is to implement a virtual private network server to establish a virtual private network with a virtual private network client implemented on a client device. The client device includes an application processor in communication with client device network interface circuitry. The application processor is to transmit a first VPN packet to the virtual private network access point via a first local area network and to transmit a second VPN packet to the virtual private network access point via a second local area network. The server processor is to convert the first and second VPN packets to first and second network packets, respectively, and transmit the first and second network packets to the wide area network.

20 Claims, 6 Drawing Sheets

(56) References Cited

U.S. PATENT DOCUMENTS

2007/0271606 A1* 11/2007 Amann ................. H04W 12/02
726/15

OTHER PUBLICATIONS

Juniper Networks, Inc., "Network Configuration Example, Configuring Link Aggregation Between EX Series Switches and Ruckus Wireless Access Points," Jul. 29, 2016, 16 pages, https://www.juniper.net/documentation/en_US/release-independent/nce/information-products/pathway-pages/nce/nce-152-LAG-Ruckus-configuring.pdf.
Juniper Networks, Inc., "Network Configuration Example, Configuring Link Aggregation Between EX Series Switches and Ruckus Wireless Access Points," Oct. 1, 2015, 16 pages.
Cisco Systems, Inc., "Small Remote or Home Office VPN Options," Feb. 10, 2016, 2 pages, https://documentation.meraki.com/MR/Client_Addressing_and_Bridging/Small_Remote_or_Home_Office_VPN_Options.

* cited by examiner

MULTIPLE LINK AGGREGATION AMONG LOCAL AREA NETWORKS

FIELD OF THE DISCLOSURE

The present disclosure generally relates to a method and apparatus for a facilitating network communications through a set of local area networks.

BACKGROUND

Businesses and consumers are increasingly turning to network resources for online business functions and entertainment. With this increased reliance on network resources, local area data networks can be overburdened, leading to delays and time-out errors.

Frequently, businesses and homes establish more than one local area network. Nevertheless, when more than one device of a similar type, such as wireless pad devices or smart phones accessing entertainment, connect to the same wireless network, one area network may experience slower data transfer rates and greater error rates, while other local area networks are underutilized. In addition, clashes with wireless networks in neighboring buildings or facilities can further increase error rates and slow data transmission rates.

As such, businesses and consumers are experiencing network access that far underperforms advertised performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Figure 1:
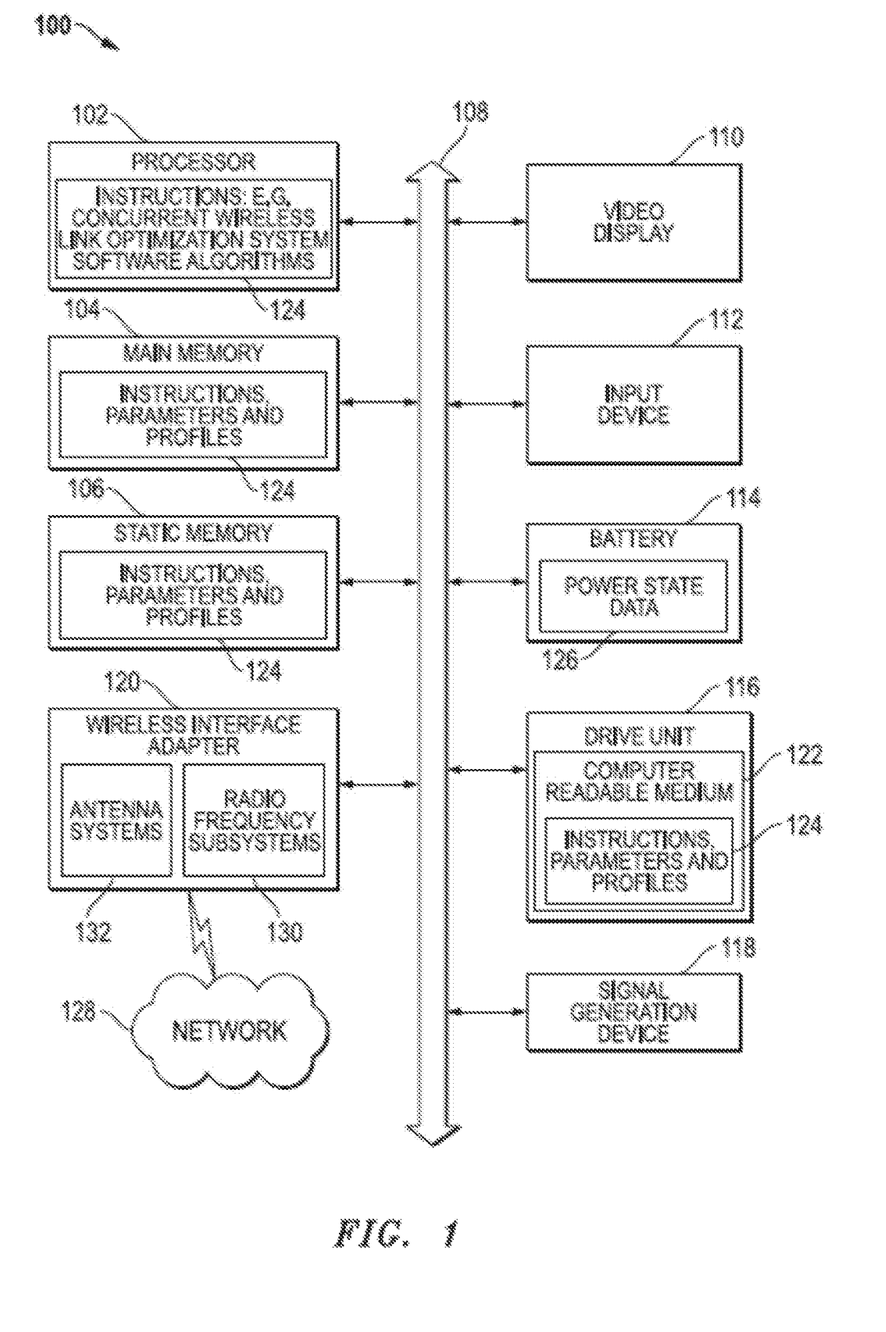
FIG. 1 is a block diagram illustrating an information handling system according to an embodiment of the present disclosure.

FIG. 1 shows an information handling system 100 capable of administering each of the specific embodiments of the present disclosure. The information handling system 100 can represent the wireless communication devices 210, 220, and 230 or servers or systems 290 located anywhere within network 200 of FIG. 2, including the remote data center 286 operating the virtual machine applications described herein. Information handling system 100 may represent a wireless communication device associated with a user or recipient of intended wireless communication. A wireless communication device may execute instructions via a processor for a context aware radio resource management system including a concurrent wireless link optimization system according to embodiments disclosed herein. The context aware radio resource management system or the concurrent wireless link optimization system may operate in some example embodiments as a software agent, in whole or in part, on a wireless communication device while other portions of the context aware radio resource management system including a concurrent wireless link optimization system may operate on remote server systems. Information handling system 100 may also represent a networked server or other system and administer aspects of the context aware radio resource management system including a concurrent wireless link optimization system via instructions executed on a processor according to various embodiments herein involving remote operation of such systems. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to the information handling system 100. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, or a mobile Smartphone.

The information handling system 100 can include a set of instructions 124 that can be executed to cause the computer system to perform any one or more of the methods or computer based functions disclosed herein. For example, instructions 124 may execute a virtual private network link aggregation system among a plurality of local area networks including concurrent wireless access between local area network components or clients, software agents, or other aspects or components. Similarly, instructions 124 may be execute the virtual private network link aggregation system among a plurality of local area networks disclosed herein for establishing aggregated multiple wireless links and resources within local area network access points and client. In some aspects, instructions 124 may be execute the virtual private network link aggregation system among a plurality of local area networks disclosed herein for operating wireless device wireless adapters, wireless link access points, base stations, and other wireless resources for the purposes of establishing aggregated links for concurrent operations within one or more wireless communication bands or other communication links such as WLAN, WiGig, Ethernet or the like. In other aspects instructions 124 may execute algorithms to regulate aggregated transmission or reception along those wireless channels or other channels within a local area network setting selected but which may occupy nearby, both physically and in frequency, wireless link channels. The virtual private network link aggregation system among a plurality of local area networks may provide multiple links within the aggregated links based on link conditions to minimize potential effects of interference. Thus, the establishment of local area network aggregation of links via a virtual private network link aggregation system among a plurality of local area networks may provide enhanced end user link experience over single link options to access points having maximum throughput levels. Further, a virtual private network link aggregation system among a plurality of local area networks from a client to an access point does not need support from upstream servers but may be supported at the local access point level. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the virtual private network link aggregation system among a plurality of local area networks may be stored here. Additionally, link aggregation data and instructions via the virtual private network link aggregation system among a plurality of local area networks may be stored here in main memory 104, static memory 106, drive unit 116, or remotely via network 128. Wireless link quality or conditions may be monitored and measured by the processor 102 during wireless link usage and stored. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the virtual private network link aggregation system among a plurality of local area networks may be executed locally or remotely between access points or clients. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, wireless controller circuitry, amplifiers and other circuitry for wireless communications. Each radiofrequency subsystem 130 may communicate with one or more wireless technology protocols. The radiofrequency subsystem 130 may contain individual subscriber identity module (SIM) profiles for each technology service provider and their available protocols. Alternatively, it may have a software based SIM profile that is reconfigurable. In yet another aspect, the radiofrequency subsystem may include an eSIM for electronic control over activate SIM profile being used. The wireless adapter 120 may also include antenna system 132 which may be tunable antenna systems for use with the system and methods disclosed herein.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G next gen operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation as described further below. In another example, the wireless adapter may operate a wireless link or wireless links in unlicensed spectrum in 4.5G, for example, using protocols such as Licensed Assisted Access (LAA) or enhanced LAA (eLAA). In some embodiments, the shared, wireless communication band may be transmitted through one or a plurality of antennas. Other shared communication frequency bands are contemplated for use with the embodiments of the present disclosure as well.

In other aspects, the information handling system 100 operating as a wireless communication device may operate a plurality of wireless adapters 120 for concurrent radio operation in one or more wireless communication bands. The plurality of wireless adapters 120 may further share a wireless communication band in some disclosed embodiments. The proximity of concurrent radio transmission or reception in a shared band precipitates a need to monitor interference or link conditions for concurrently operating wireless communication devices as with client information handling systems operating via local area networks of the present disclosure. Similarly, the proximity of concurrent radio transmission or reception in client information handling systems may further precipitate use of changing wireless links among the aggregated wireless links to a local area network access point in some embodiments of the present disclosure.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment, the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may measure various metrics relating to wireless communication pursuant to operation of a context aware radio resource management system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller may manage one or more radio frequency subsystems 130 within a wireless adapter 120. The wireless controller also manages transmission power levels which directly affect radio frequency subsystem power consumption. To detect and measure power consumption by a radio frequency subsystem 130, the radio frequency subsystem 130 may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated in an example embodiment.

The wireless network may have a wireless mesh architecture in accordance with mesh networks described by the wireless data communications standards or similar standards. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
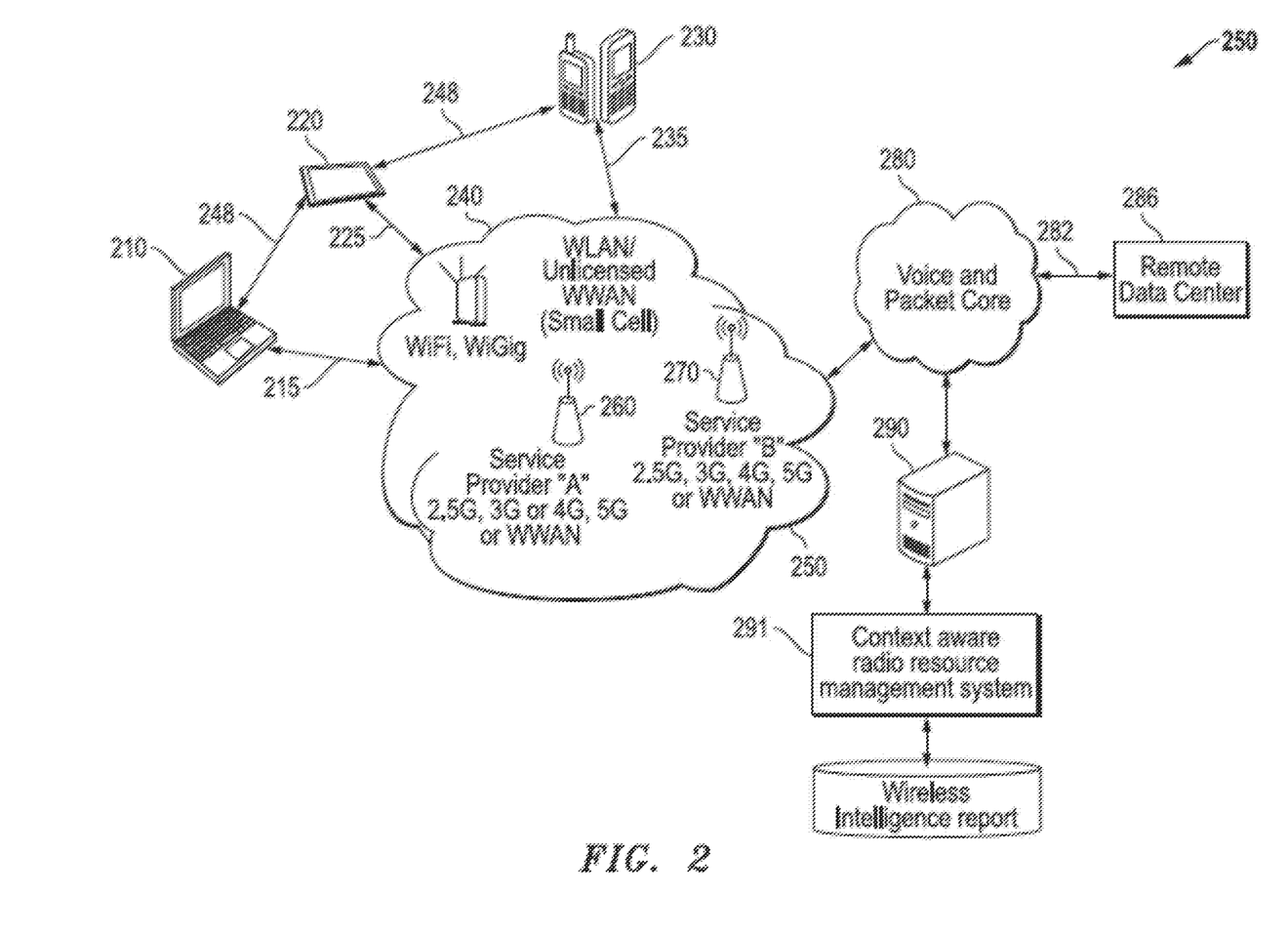
FIG. 2 is a block diagram of a network environment offering several communication protocol options and wireless devices according to an embodiment of the present disclosure.

FIG. 2 illustrates a network 200 that can include one or more information handling systems. In a particular embodiment, network 200 includes networked wireless communication devices 210, 220, and 230, wireless network access points, and multiple wireless connection link options. The network can include one or more wired communication devices or links. For example, communication device 210 can include a wired link, such as an Ethernet link. A variety of additional computing resources of network 200 may include client mobile information handling systems, data processing servers 290, network storage devices, local and wide area networks, or other resources as needed or desired. As specifically depicted, systems 210, 220, and 230 may be a laptop computer, tablet computer, or smartphone device. These wireless communication devices 210, 220, and 230, may access a wireless local network 240, or they may access a macro-cellular network 250. In a further example, the system 230, such as a laptop, can alternatively access a local network 240 using a wired link, such as a wired Ethernet connection. In an example, the wireless local network 240 may be the wireless local area network (WLAN), a wireless personal area network (WPAN), or a wireless wide area network (WWAN). In one example embodiment, a stand-alone mobile information handling system 210, 220, or 230 may operate on WLAN such as Wi-Fi or on unlicensed WWAN small cell wireless links such as with small cell unlicensed LTE substations in wireless local network 240. Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, according to the present disclosure, a networked wireless communication device 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900

MHz or similar bands as understood by those of skill in the art. Within local portion of wireless network 250 access points for Wi-Fi or WiGig as well as small cell WWAN connectivity may be available in emerging 5G technology. This may create issues with selection of optimal wireless links when concurrent communication on both WLAN and WWAN access may operate within the same communication frequency bands. Such issues may be addressed or mitigated with remedies according to the context aware radio resource management system including a concurrent wireless link optimization system 291 according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional wireless communication devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In an example embodiment, the cloud or remote data center 286 or networked server 290 may run hosted applications for systems 210, 220, and 230. For example, remote data center 286, networked server 290, or some combination of both may operate some or all of a plurality of hosted applications. This may occur by establishing a virtual machine application executing software to manage applications hosted at the remote data center 286 in an example embodiment. Wireless communication devices 210, 220, and 230 are adapted to run one or more applications locally, and to have hosted applications run in association with the local applications at remote data center 286 or networked server 290. For example, wireless communication devices 210, 220, and 230 may operate some or all of the hosted applications on a remote server via local area network connectivity using a virtual private network link aggregation system among the plurality of local area networks in some embodiments. The virtual machine application may serve one or more applications to each of wireless communication device 210, 220, and 230. Thus, as illustrated, systems 210, 220, and 230 may be running applications locally while requesting data objects related to those applications from the remote data center 286 via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at remote data center 286 that represents a Sharepoint data storage server. In a further example, a web browser application may be operating at system 230. The web browser application may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, wireless communication devices 210, 220, and 230 may communicate intra-device via 248 when one or more of the wireless communication devices 210, 220, and 230 are set to act as an access point or even potentially a WWAN connection via small cell communication or licensed small cell WWAN connections. For example, one of wireless communication devices 210, 220, and 230 may serve as a Wi-Fi hotspot in an embodiment. Since one aspect of the disclosed embodiments involves setting up a virtual private network between client devices such as 210, 220, 230 and an access point for local area networks via a virtual private network link aggregation system among the plurality of local area networks according to various embodiments, no particular wireless link selection is depicted in FIG. 2.

The connection quality of service (QOS) and speed of wireless links 215, 225, and 235 may vary widely depending on several factors including the service provider bandwidth, the number of wireless communication devices and users in a location, and other factors. Quality of service impacts energy consumption and efficiency of a wireless communication device communicating wirelessly. Thus, selection of a wireless link among aggregated local area network links such as WLAN links may depend on assessment of the link radio frequency conditions. Radio frequency conditions for wireless links will evolve over time. Differences in wireless link QOS or efficiency will also vary minute-by-minute, hourly, daily, weekly or monthly or during even longer periods. Thus, assessment may be regular.

For this reason, the wireless communication device operating context can play an important role in determining wireless link conditions and efficiency from a power consumption standpoint. Information about wireless link connection quality and capacity for a service to be used can be advantageous in optimizing communication channel selection. Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the wireless communication device used. Certain protocols may not be available on some mobile information handling systems. In each instance, radio frequency transmission subsystems and controllers operate and consume device power. Based on these numerous factors, the system of the present embodiment may automatically select among aggregated local area network links to optimize radio frequency conditions, traffic conditions, device power consumption, cost, or any of the above.

Further, concurrent radiofrequency bands may be used having several channels for wireless link connections and which may include with potential overlapping use of shared radiofrequency bands including unlicensed bands and conditional shared communication frequency bands available under FCC Part 96 with use under Wi-Fi and emerging 5G technologies such as unlicensed small cell wireless links. Accordingly, wireless links 215, 225 and 235 may represent concurrent wireless links for two or more protocols operating within similar frequency bands. With the rise of multiple wireless protocols operating within shared communication frequency bands, wireless links may operate on separate channels within the communication frequency band, including within neighboring channels. In other aspects, the possibility further arises that wireless protocols within a communication frequency band may even attempt to operate on the same channel within a shared communication frequency band. Aspects of the present disclosure may determine potential conflicts within shared communication frequency bands as well as manage or mitigate interference that may arise within such situations.

In an example, a virtual private network link aggregation system among the plurality of local area networks may include a client device in communication with an access point via a plurality of local area networks. The client device or the access point can be implemented using features of the above-described information handling system. Such client device and server can communicate over a plurality of local area networks, for example, including features described in relation to network 240. The access point can access a wide area network, for example, comprising networks described above.

Figure 3:
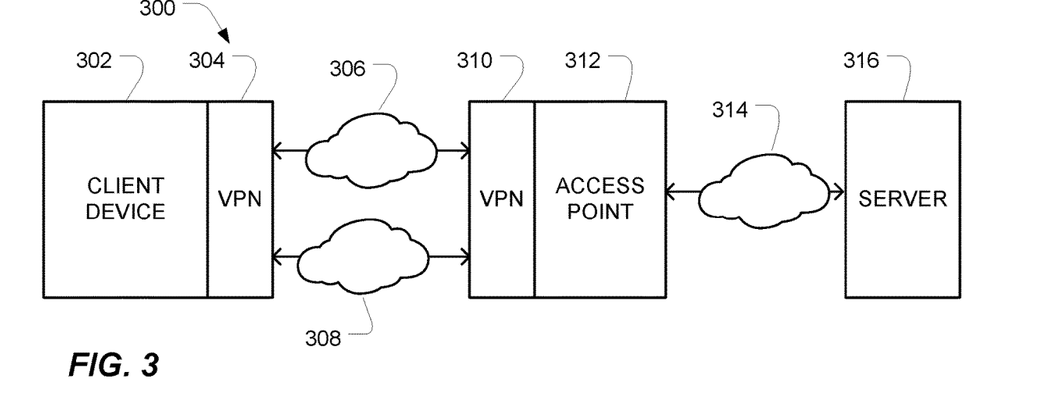
FIG. 3 is a block diagram illustrating a communications system according to an embodiment of the present disclosure.

As illustrated in FIG. 3, a system 300 includes a client device 302 implementing a virtual private network (VPN) client 304 in communication with a plurality of networks (e.g., a local area network 306 or a local area network 308). In an example embodiment, the aggregated links of local area networks 306 and 308 may be established via a virtual private network link aggregation system among the plurality of local area networks 306 and 308. An access point 312 implements a virtual private network (VPN) server 310 in communication with the virtual private network (VPN) client 304 of the client device 302 via the plurality of local area networks (e.g., local area networks 306 or 308). Other aggregator systems are contemplated to operate as an aggregator, similar to a VPN as shown, between a VPN client 304 of client device 302 and a server portion 310 of an access point 312. For example, aggregation techniques of a variety of types may be implemented as understood for aggregation of a plurality of local area networks 306 and 308 including known aggregation techniques or newly developed aggregation. A VPN aggregation between server 310 and client 304 is but one example embodiment of an aggregation technique. In addition, the access point 312 can interface with a wide area network 314 to access other servers or network devices 316. As used in herein, the access point 312 is network equipment positioned between a wired area network, such as the wide area network 314, and a plurality of local area networks, such as local area networks 306 and 308.

The plurality of local area networks, such as local area networks 306 or 308, can be implemented using a variety of wired or wireless protocols. For example, a local area network on the plurality of local area networks can be implemented using a wired protocol, such as Ethernet or the like. In another example, the plurality of local area networks can include wireless networks, such as wireless at networks implemented in accordance with IEEE 802.11 Wi-Fi, IEEE 802.11ad WiGig, IEEE 802.15 WPAN, or a combination thereof.

The wide area network 314 can be implemented using a variety of networking technologies over a larger region or area or the globe. For example, the wide area network 314 can include a global network, such as the Internet. In another example, the wide area network can incorporate cellular data networks, such as macro-cellular wireless connections including 2G, 2.5G, 3G, 4G, 5G or the like, wired networks, optical networks, or combinations thereof.

The access point 312 can be implemented in a router, gateway, modem, wireless router, or any combination thereof. For example, the access point 312 can be implemented in a router providing wireless and wired network access. The router can be connected to a modem or gateway providing access to the wide area network 314. In another example, the access point 312 can be implemented in a gateway that provides both wired and wireless networks.

The client device 302 can be a device configured to access one or more local area networks using wired or wireless protocols. For example, the client device 302 can be a laptop or desktop computer, a tablet, a smart phone, or other network devices, such as a networked printer, scanner, hard drive, television, entertainment device, or gaming console, or any combination thereof.

The virtual private network (VPN) client 304 or other aggregator type client implemented by the client device 302 can monitor and interact with the plurality of local area networks, such as local area networks 306 or 308. This is an example embodiment of the operation of the VPN link aggregation system among the plurality of local area networks. For example, the VPN client 304 utilizing the VPN link aggregation system can select a local area network from a plurality of local area networks via which to transmit a virtual private network (VPN) packet to the virtual private network server 310. As a further example, the VPN client 304 using a client agent of the VPN link aggregation system can monitor performance parameters, such as activity, error rates, transmission rates, bandwidth, latency, jitter, noise, signal-to-noise, or network speed, among the plurality of local area networks and select a local area network through which to send a particular VPN packet based on the monitored parameters. As usage, error rates, bandwidth, transmission rates, or other performance parameters vary on each local area network of the plurality of local area networks, the VPN client 304 can selectively send VPN packets across different local area networks with the VPN link aggregation system. In another example, the VPN client 304 can randomly select a network among the available local area networks to selectively send VPN packets. In a further example, the VPN client 304 can select from among the available local area networks in a round-robin or sequential manner. Random selection or sequential selection may not utilize network performance monitoring. Using one or more of the above network selection methods, the VPN client 304 can send a first VPN packet via the first local area network 306 of the plurality of local area networks, and can send a second VPN packet via a second local area network 308 of the plurality of local area networks.

Conversely, the VPN client 304 can receive VPN packets from the virtual private network (VPN) server 310 via more than one local area network of the plurality of local area networks using the VPN link aggregation system in an embodiment. For example, the VPN client 304 can receive a VPN packet via the first local area network of the plurality of local area networks and can receive a different VPN packet via the second local area network of the plurality of local area networks. The VPN client 304 can optionally decrypt received packets, assemble data from the packets, and provide the data for processing.

The VPN server 310 can receive VPN packets from the VPN client via local area networks of the plurality of local area networks with the VPN link aggregation system of embodiments of the present disclosure. For example, the VPN server 310 can receive the first VPN packet via the first local area network of the plurality of local area networks and can receive the second VPN packet via the second local area network of the plurality of local area networks. The VPN server 310 can optionally decrypt the VPN packets. Depending upon the nature of the VPN packets, the access point 312 can forward the decrypted network packets through the wide area network 314 to servers or other network equipment 316 in communication with the wide area network 314. Alternatively, the access point 312 can further process the received data or forward the data to other network equipment in communication with a local area network of the plurality of local area networks.

When the access point 312 receives packets from the wide area network 314 intended for the client device 302, the VPN server 310 with the VPN link aggregation system can prepare the packets for transmission across a local area network of the plurality of local area networks. For example, the VPN server 310 can encrypt network packets in preparation for sending the packets across the established virtual private network. Further, the VPN server 310 can monitor the local area networks of the plurality of local area networks to determine via which local area network to send the VPN packets. For example, the VPN server 310 can send a VPN packet via the local area network 306 and can send another VPN packet via the local area network 308. The client device 302 via the virtual private network client 304 can receive the VPN packets sent via both the local area networks 306 and 308 and can provide those VPN packets for further processing, such as decryption and assembly. The above system is not limited to VPN packets but may include a server 304 and client 310 relationship in other aggregation techniques for aggregation of local area networks 306 or 308 between client device 302 and access point 312 as described including current and future systems for aggregation.

Figure 4:
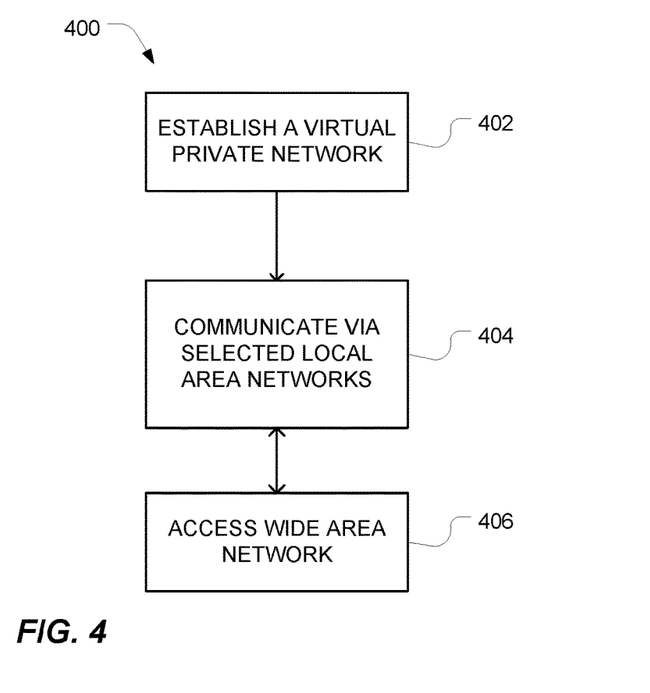
FIG. 4 is a block flow diagram illustrating a method for communicating according to embodiments of the present disclosure.

FIG. 4 illustrates a method 404 for implementing communication between the client device and a wide area network via a VPN link aggregation system or other aggregation link system according to embodiments of the present disclosure. For example, the client device can establish a virtual private network with a VPN server operating a VPN link aggregation system or other aggregation type with a plurality of local area networks accessible by the client device, as illustrated at block 402. Depending upon the nature of the virtual private network, the VPN client can exchange encryption keys with the VPN server when establishing the network. In another example, encryption keys may have been established prior to establishing the virtual private network or may be stored and implemented on each of the VPN client and VPN server prior to communications to establish the virtual private network. The virtual private network can be established utilizing protocols including Internet Protocol Security (IPsec), Transport Layer Security, Datagram Transport Layer Security, Microsoft Point-to-Point Encryption, Secure Socket Tunneling Protocol, modifications or a combination thereof or other protocols available of under development.

Following the establishment of the virtual private network, the VPN client can communicate with the VPN server using select local area networks of a plurality of local area networks, as illustrated at block 404. Implementation of the VPN link aggregation system on the VPN server at an access point and VPN link aggregation system agents at one or more VPN clients may provide for this aggregated communication. The VPN client or the VPN server can select a local area network through which to send a VPN packet based on parameters associated with the performance of the local area network. For example, a local area network may exhibit desired bandwidth, error rate, transmission rate, or combination thereof.

As illustrated at block 406, the VPN server can be implemented on a local area network access point that has access to a wider area network. VPN packets received from the VPN client at the VPN server at the access point can be prepared for transmission over the wide area network. Network packets received from the wide area network can be prepared for transmission via the established virtual private network from the VPN server implemented on the access point to a VPN client implemented on a client device.

Figure 5:
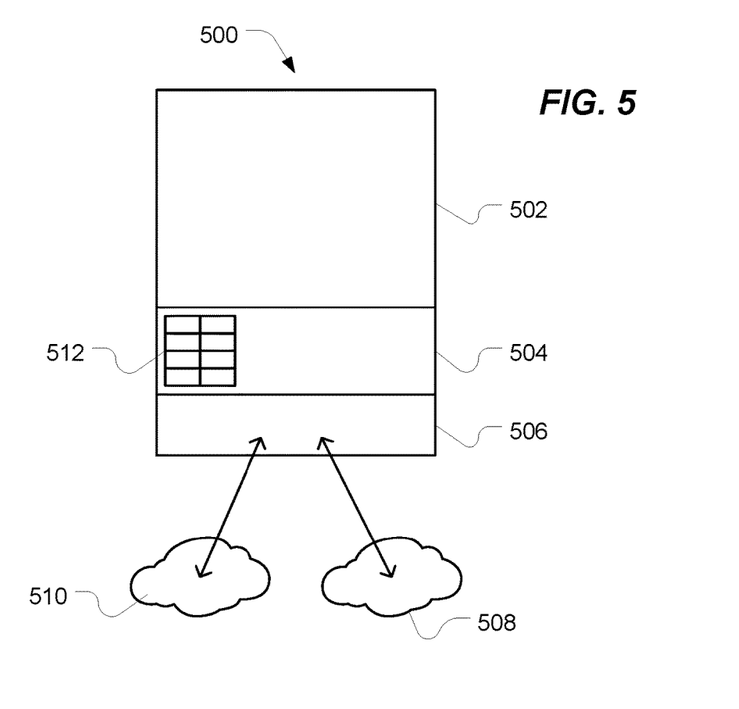
FIG. 5 is a diagram illustrating a client device according to an embodiment of the present disclosure.

FIG. 5 illustrates an exemplary layered network interface at a client device 500 operating within the VPN link aggregation system or other type of aggregation system according to embodiments of the present disclosure. As implemented by a processor of the client device 500, upper level network layers and applications 502 can prepare data to be transmitted over networks to other devices. A middle layer 504 of the communications protocols can be implemented as a VPN client operating client agent instructions of the VPN link aggregation system. The VPN client can packetize and optionally encrypt the data to form VPN packets from the data. The VPN packets can be stored in a queue 512 in preparation to be transmitted via local area networks. Further, the virtual private network client implemented in the middle layer 504 can monitor performance of the local area networks, such as local area networks 508 and 510. Depending upon the performance parameters monitored by the VPN client, a packet from the queue 512 can be selectively transmitted through lower network layers 502 to a select one of the local area networks. For example, a first packet from the queue 512 can be transmitted via the local area network 508 when conditions indicate that the local area network 508 is preferable relative to the local area network 510. A second packet from the queue 512 can be transmitted through the lower network layers 502 to the local area network 510 when parameters indicate that the lower local area network 510 is preferable relative to the local area network 508. The VPN packets can be derived from data associated with the same application or different applications. As such, depending on the performance parameters associated with the performance of local area networks 508 or 510, packets can be transmitted from the queue 512 over the select local area network 508 or 510 to the virtual private network server.

Alternatively, a network can be selected randomly or the networks can be selected sequentially or in a round-robin manner. In such an example, a first packet from the queue would be sent on a first randomly selected network 508 or a next network 508 in a list of networks, and a second packet from the queue would be sent on a second randomly selected network 510 or a subsequent network 510 in a list of networks.

Further, VPN packets can be received via the local area networks 508 and 510. The VPN packets can be processed through the network layers, such as 502 and 504 to decrypt the VPN packets and reassembled data to be used by higher network layers and applications 502.

In an example, the virtual private network client is implemented in a middle layer 504 of the network layers, such as layer 3. Alternatively, the VPN client can be implemented in layer 2, layer 3, or combination thereof in other embodiments of the VPN link aggregation system operating via agent instructions on VPN client systems. As described, above system is not limited to VPN packets but may include a server and client relationship via other aggregation techniques for aggregation of local area networks between a client device and access point for communications.

Figure 6:
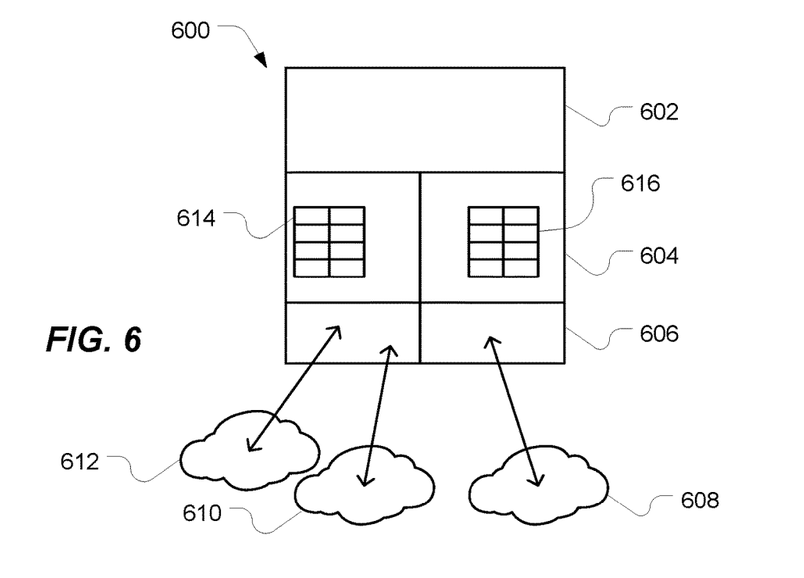
FIG. 6 is a block diagram illustrating an access point according to an embodiment of the present disclosure.

FIG. 6 illustrates an exemplary access point 600 implementing a VPN server operating a VPN link aggregation system according to embodiments of the present disclosure. In an example, a VPN packet can be received from a VPN client via a plurality of local area networks, such as local area networks 610 or 612. Such packets can be processed by a VPN server operating the VPN link aggregation system implemented in the middle layer 604 of a set of network layers 602, 604, and 606. Optionally, the VPN packets received from the local area networks can be processed, such as decrypting, assembling, and providing the data to higher network layers and processes 602. Alternatively, the VPN packets received via the local area networks can be processed, for example, to decrypt the VPN packets to provide network packets that can be provided to a queue 616 in preparation to be transmitted via the wide area network 608. Conversely, network packets received via the wide area network 608 can be processed through the lower network layers 606 and the middle network layers 604 implementing the virtual private network server operating the VPN link aggregation system for the plurality of local area networks 608, 610 and 612. The network packets are converted into VPN packets to be stored in the queue 614. For example, the network packets can be encrypted and prepared for sending across the virtual private network to a VPN client. The VPN server implemented in the middle layer 604 can monitor the plurality of local area networks, select a local area network based on desirable transmission parameters and transmit one or more VPN packets form the queue 614 via the selected local area network such as local area network 610 or 612. For example, the VPN server with the VPN link aggregation system implemented in the network layer 604 can monitor the performance of local area networks 610 and 612 and can selectively transmit VPN packets from the queue 614 via the local area network 610 when performance parameters of the local area network 610 are desirable relative to those parameters of the local area network 612, and can transmit VPN packets from the queue 614 via the local area network 612 when the performance parameters associated with the local area network 612 are preferable over those parameters of the local area network 610. As described, above system is not limited to VPN packets but may include a server and client relationship via other aggregation techniques for aggregation of local area networks between a client device and access point for communications among local area networks aggregated.

Alternatively, a local area network can be selected randomly or the local area network can be selected sequentially or in a round-robin manner. In such an example, a first packet from the queue 614 would be sent on a first randomly selected network 610 or a next network 610 in a list of networks, and a second packet from the queue 614 would be sent on a second randomly selected network 612 or a subsequent network 612 in a list of networks.

Figure 7:
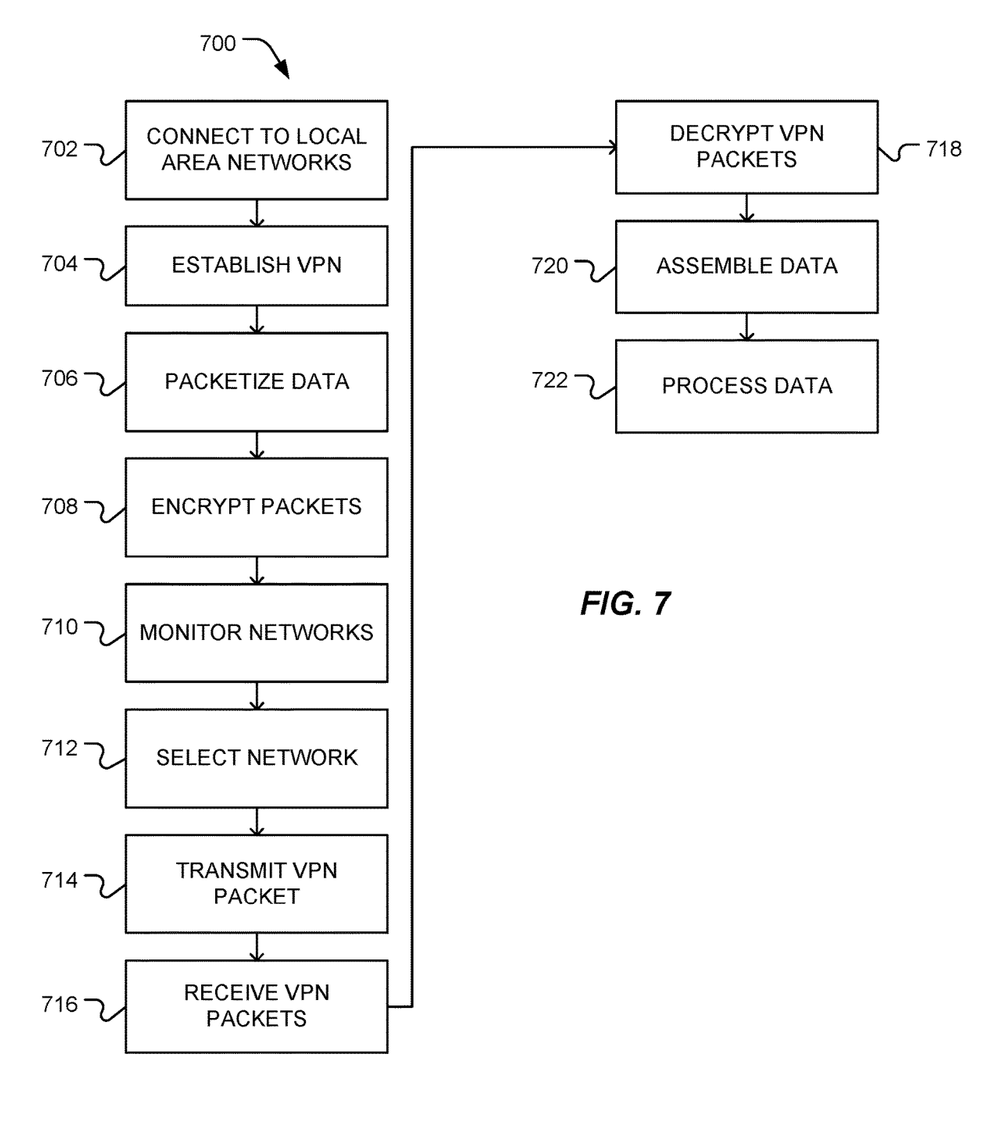
FIG. 7 is a block flow diagram illustrating a method for communicating according to an embodiment of the present disclosure.

Turning to FIG. 7, a method 700 implemented on a client device includes connecting to a plurality of local area networks via a set of instructions operating on the VPN link aggregation system client side according to embodiments herein, as illustrated at block 702. Although VPN link aggregation is described in the example embodiment for client side communications, various protocols or other aggregation techniques for aggregation of local area networks between a client device and access point for communications among local area networks are contemplated as well and it is understood may operate via a method similar to 700. For example, the plurality of local area networks can include a wired local area network, such as a local area network implemented using protocols such as Ethernet. In another example, the plurality of local area networks can include wireless local area networks, such as local area networks implemented using protocols such as IEEE 802.11 Wi-Fi, IEEE 802.11ad WiGig, IEEE 802.15 WPAN, or a combination thereof.

As illustrated in block 704, the client device can implement a VPN client of the VPN link aggregation system client agent that establishes a virtual private network with the VPN server operating the VPN link aggregation system via one or more of the plurality of local area networks. For example, the VPN client and the VPN server may exchange encryption passwords or may perform a handshake or authentication procedure. In another example, the VPN client and the VPN server can establish a point-to-point link. In a further example, the VPN client and the VPN server can establish virtual private network utilizing a tunneling protocol.

As data to be transmitted is generated, the processor of the client device can packetize the data, as illustrated at block 706, and optionally encrypt the data, as illustrated at block 708, to generate VPN packets using the implemented virtual private network client via the VPN link aggregation system. Alternatively, the packetized data can remain unencrypted when stored and transmitted. Such VPN packets can be stored in a queue to be transmitted via select local area network of the plurality of local area networks.

The client device implementing the virtual private network client of the VPN link aggregation system agent instructions can monitor parameters of the local area networks of the plurality of local area networks aggregated, as illustrated at block 710. In an example, the VPN client can monitor performance parameters, such as activity, error rates, transmission rates, bandwidth, latency, jitter, noise, signal-to-noise, or network speed of the local area networks.

As illustrated at block 712, the VPN client can select a local area network via which to transmit one or more of the VPN packets to the VPN server from the aggregated local area network link options via the VPN link aggregation system. The network of the plurality of local area networks that is selected to transmit the VPN packets can be selected based on the monitor performance parameters. For example, a local area network experiencing less traffic and having a higher transmission rate than other local area networks of the plurality of local area networks can be selected to transmit VPN packets. Alternatively, the network can be selected based on a sequential list of networks or randomly from a set of networks. As illustrated at block 714, the VPN packet can be transmitted via the selected local area network.

As the performance parameters change among local area networks, a different local area network of the plurality of local area networks can be selected that has more desirable performance by the VPN link aggregation system. For example, a first VPN packet can be sent via a first local area network. As VPN packets being sent by the client device and traffic generated by other devices connected to the first local area network influence performance parameters of the first local area network, a second local area network can be selected and a second VPN packet can be transmitted via the second local area network. For example, a set of VPN packets can be assigned to the first local area network and by their nature can utilize bandwidth of the first local area network, making transmission along a second local area network desirable for transmitting a subsequent set of VPN packets. In such a manner, the VPN client operating with the VPN link aggregation system for local area networks can take advantage of the available bandwidth of each of the local area networks through which the virtual private network with the VPN server is implemented.

In addition, the VPN client can receive VPN packets from the plurality of local area networks and further process data in the VPN packets for use by the client device via the VPN link aggregation system. For example, as illustrated at block 716, the VPN client can receive VPN packets sent from the VPN server via one or more of the plurality of local area networks. As above, the VPN server can select local area networks based on performance parameters and transmit VPN packets via different local area networks to take advantage of the performance of each of the local area networks using the VPN link aggregation system for local area networks.

As implemented by a processor of the client device, the VPN client can optionally decrypt the VPN packets, as illustrated at block 718, and assemble data associated with the VPN packets, as illustrated at block 720. The VPN client can provide the assembled data to other processes and applications, as illustrated at block 722.

Figure 8:
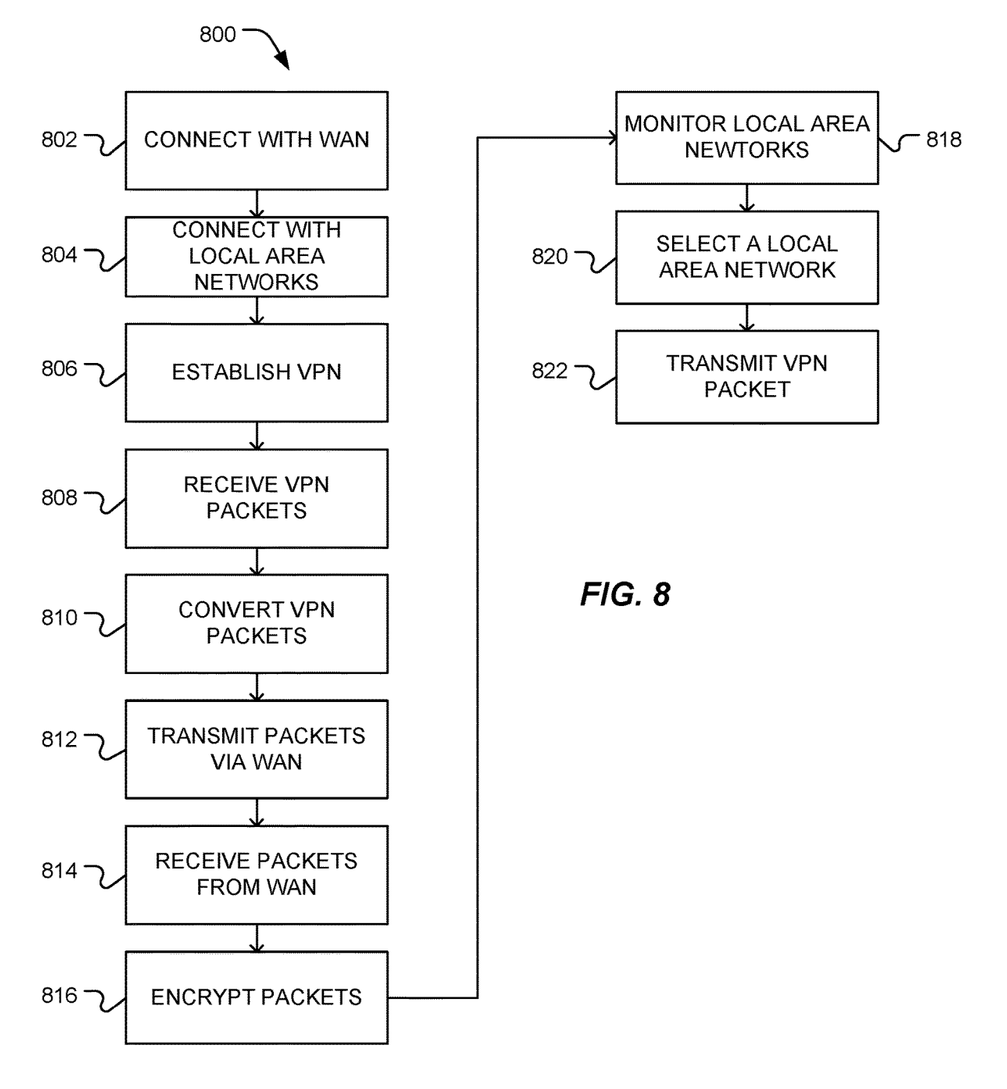
FIG. 8 is a block flow diagram illustrating a method for communicating according to another embodiment of the present disclosure.

From the perspective of the VPN server, communications can be established between a wide area network and a VPN client device utilizing the method 800 illustrated in FIG. 8 according to embodiments of the present disclosure. For example, an access point implementing a virtual private network server operating a VPN link aggregation system with a plurality of local area networks connecting with one or more client devices can also connect to a wide area network, as illustrated at block 802. The wide area network can be a network utilizing a variety of networking protocols and interconnected networks. In particular, the wide area network can be connected to a global network, such as the Internet. Again, although a VPN link aggregation is described in the example embodiment for server side communications from an access point, various protocols or other aggregation techniques for aggregation of local area networks between a client device and access point for communications among local area networks are contemplated as well and it is understood may operate via a method similar to 800.

Further, the access point can connect to a plurality of local area networks via the VPN link aggregation system according to embodiments of the present disclosure, as illustrated at block 804. For example, the plurality of local area networks can include a wired local area network, such as a local area network implemented using protocols such as Ethernet. In another example, the plurality of local area networks can include wireless local area networks, such as local area networks implemented using protocols such as IEEE 802.11 Wi-Fi, IEEE 802.11ad WiGig, IEEE 802.15 WPAN, or a combination thereof.

As illustrated 806, the access point implementing a VPN server can establish a virtual private network using the VPN link aggregation system with a client device implementing a VPN client. The VPN client implemented by the client device can transmit VPN packets by different local area networks of the plurality of local area networks aggregated with the VPN link aggregation system. The VPN packets are received at the VPN server, as illustrated at block 808. For example, a first VPN packet can be received from a first local area network of the plurality of local area networks, and a second VPN packet can be received via a second local area network of the plurality of local area networks.

As illustrated a block 810, the VPN packets can be converted. For example, the VPN packets can optionally be decrypted and can be re-encoded as network packets to be transmitted via the wide area network. In another example, the VPN packets can be decoded and assembled for further processing by the access point or the VPN server or can be sent to other networked devices via a local area network of the plurality of local area networks.

As illustrated at block 812, network packets converted from the VPN packets can be transmitted by the wide area network. For example, a network packet may be transmitted to servers or other network devices that access the wide area network.

Often, servers and other network equipment will respond to packets received from the client device via the access point with further network packets. For example, network packets can be received from the wide area network by the access point implementing the virtual private network server, as illustrated at block 814. The implemented VPN server can process such network packets to formulate VPN packets to be sent to the client device via one or more of the local area networks with the VPN link aggregation system. For example, the VPN server implemented at the access point can optionally encrypt the network packets, as illustrated at block 816, and store the VPN packets in a queue to be transmitted via one or more local area networks available through aggregation by the VPN link aggregation system. Alternatively, the packets remain unencrypted when stored or transmitted.

The VPN server can monitor the behavior and performance of the local area networks in some embodiments of the VPN link aggregation system, as illustrated at block 818. For example, the VPN server can optionally monitor the performance parameters, such as activity, error rates, transmission rates, bandwidth, latency, jitter, noise, signal-to-noise, or network speed of the local area networks.

As illustrated at block 820, a local area network of the plurality of local area networks can be selected for transmission of the VPN packets based on operation of the VPN link aggregation system at the VPN server in the local area network access point in some embodiments. Alternatively, the local area network can be selected based on a sequential list or randomly among a set of local area networks. The VPN packets can be transmitted along a select local area network, as illustrated at block 822. For example, a VPN packet can be transmitted along the first network local area network of the plurality of aggregated local area networks based on the monitored parameters, and another VPN packet can be transmitted along a second local area network based on the monitor performance of the plurality of local area networks.

In such a manner, the system can utilize the combined resources of the plurality of local area networks when implementing the virtual private network. As VPN packets are queued, the local area network with desirable performance relative to other local area networks can be selected for transmitting the VPN packets. The VPN packets can be associated with the same application or can be associated with different applications or processes. As that local area network becomes burdened, a different local area network can be selected. Accordingly, the aggregated transmission rate for VPN packets can be greater than the transmission rate available through any one of the local area networks.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   network interface circuitry of a wireless access point in communication with a plurality of local area networks including a first local area network and a second local area network for receiving data and in communication with a wide area network to transmit data received from the plurality of local area networks;
   a server processor merged with the access point and in communication with the network interface circuitry;
   the server processor of the wireless access point to implement a virtual private network (VPN) between the wireless access point and a VPN client implemented on a client information handling system, where the VPN aggregates a first data link to the client information handling system via the first local area network and a second data link to the client information handling system via the second local area network to receive data from the client information handling system;
   the server processor of the wireless access point to receive a first VPN packet from the VPN client of the client information handling system via the first local area network and to receive a second VPN packet from the VPN client of the client information handling system via the second local area network and to terminate the VPN at the wireless access point;
   the server processor of the wireless access point to concatenate in an order according to the timestamps of receiving the first VPN packet and the second VPN packet and to convert the first VPN packet and second VPN packets to a first wide area network (WAN) packet and second WAN packet, respectively; and
   the wireless access point to transmit the first and second WAN packets to a host server via the network interface circuitry on a wireless link of the WAN.

2. The information handling system of claim 1, wherein the server processor of the wireless access point to convert the first VPN packet and the second VPN packet includes decrypting the first and second VPN packets before converting to the first WAN packet and the second WAN packet respectively.

3. The information handling system of claim 1, further comprising the server processor of the access point to receive a third WAN packet and a fourth WAN packet from the host server on the WAN, the server processor to convert the third WAN packet and the fourth WAN packet to a third VPN packet and fourth VPN packet respectively, the server processor of the wireless access point to transmit the third VPN packet via the first local area network and to transmit the fourth VPN packet via the second local area network on the VPN established between the wireless access point and the VPN client on the client information handling system.

4. The information handling system of claim 3, further comprising the server processor of the wireless access point to monitor the first local area network and the second local area network.

5. The information handling system of claim 4, wherein the server processor of the wireless access point is to monitor activity, error rates, transmission rates, bandwidth, latency, jitter, noise, signal-to-noise, network speed, or a combination thereof for the plurality of local area networks.

6. The information handling system of claim 4, further comprising the server processor of the wireless access point to select the first local area network randomly or sequentially from the plurality of local area networks.

7. The information handling system of claim 3, further comprising the server processor of the virtual access point to form a queue of VPN packets to be transmitted to the virtual private network client from the wireless access point on the VPN including the first local area network link and the second local area network link.

8. A method of communicating between a client information handling system and a wide area network via a wireless access point, the method comprising:
   establishing, at the wireless access point, a wireless link communication with a wide area network;
   establishing, at a server merged with the wireless access point, data links for communication with a plurality of local area networks via a VPN link aggregation system;
   establishing, at the wireless access point, a virtual private network between the wireless access point and a client device in communication with wireless access point via a plurality of data links on the plurality of local area networks, the virtual private network aggregating data received via at least a first data link to the client device on a first local area network and a second data link to the client device on a second local area network from the plurality of local area networks;
   receiving, at the wireless access point, a first VPN packet from the client device via the first data link of the first local area network of the plurality of local area networks;
   receiving, at the wireless access point, a second VPN packet from the client device via the second data link of the second local area network of the plurality of local area networks, concatenated in an order according to the timestamps of receiving the first VPN packet and the second VPN packet by the VPN link aggregation system;
   terminating the VPN at the wireless access point and converting the first VPN packet and the second VPN packets to a first wide area network (WAN) packet and a second WAN packet, respectively; and
   transmitting the first WAN packet and second WAN packet to a host server on a wireless link via the wide area network.

9. The method of claim 8, wherein converting the first VPN packet and the second VPN packet includes decrypting the first VPN packet and the second VPN packet before forming the first WAN packet and the second WAN packet respectively.

10. The method of claim 8, further comprising receiving WAN packets at the wireless access point from the wide area network on the wireless link.

11. The method of claim 10, further comprising converting a third WAN packet and a fourth WAN packet received at the wireless access point to third VPN packet and a fourth VPN packet respectively for transmission via the VPN on the aggregated first data link and second data link to the client information handling system.

12. The method of claim 11, monitoring the plurality of local area networks and selecting the first data link on the first local area network via which to transmit the third VPN packet based on the monitoring and selecting the second data link on the second local area network via which to transmit the fourth VPN packet based on the monitoring.

13. An information handling system comprising:
   network interface circuitry of a wireless access point in communication with a plurality of local area networks including a first local area network and a second local area network configured to establish a wireless link communication with a wide area network and data links for communication with a plurality of local area networks via a VPN link aggregation system at a server merged with the wireless access point,
   the wireless access point configured to establish a virtual private network between the wireless access point and a client device in communication with the wireless access point via the plurality of local area networks, the virtual private network aggregating data received via at least a first data link to the client device on a first local area network and a second data link to the client device on a second local area network from the plurality of local area networks;
   the wireless access point configured to receive a first VPN packet from the client device via the first local area network of the plurality of local area networks and configured to receive a second VPN packet from the client device via the second local area network of the plurality of local area networks and concatenated in an order according to the timestamps of receiving the first VPN packet and the second VPN packet by the VPN link aggregation sy stem;
   the wireless access point configured to terminate the VPN and convert the first VPN packet and the second VPN packets to a first wide area network (WAN) packet and a second WAN packet, respectively; and
   the server merged with the wireless access point and in communication with the network interface circuitry configured to transmit the first WAN packet and second WAN packet to a host server on via the wide area network.

14. The information handling system of claim 13, wherein a server processor of the sever merged with the wireless access point to decrypt the first VPN packet and the second VPN packet and then convert the first VPN packet and the second VPN packet respectively.

15. The information handling system of claim 13, further comprising:
   the server merged the wireless access point to receive a third WAN packet and a fourth WAN packet from the host server on the WAN, the server to convert the third WAN packet and the fourth WAN packet to a third VPN packet and fourth VPN packet respectively; and
   the server merged with the wireless access point to transmit the third VPN packet via the first local area network and to transmit the fourth VPN packet via the second local area network on the VPN established between the wireless access point and the client device.

16. The information handling system of claim 13, further comprising:
the server merged with the wireless access point to monitor the first local area network and the second local area network.

17. The information handling system of claim 16, wherein the server merged with the wireless access point is to monitor activity, error rates, transmission rates, bandwidth, latency, jitter, noise, signal-to-noise, network speed, or a combination thereof for the plurality of local area networks.

18. The information handling system of claim 13, further comprising:
the server merged with the wireless access point configured to select the first local area network randomly or sequentially from the plurality of local area networks.

19. The information handling system of claim 13, further comprising:
the server merged with wireless access point to form a queue of VPN packets to be transmitted to the client device from the wireless access point on the VPN including the first local area network link and the second local area network link.

20. The information handling system of claim 13, wherein the plurality of local area networks includes a Wi-Fi local area network.

* * * * *